United States Patent
Park et al.

(10) Patent No.: US 10,774,721 B2
(45) Date of Patent: Sep. 15, 2020

(54) WASTE HEAT RECOVERY APPARATUS AND CONTROL METHOD THEREFOR

(71) Applicant: KOREA ELECTRIC POWER CORPORATION, Naji-si (KR)

(72) Inventors: Jung Keuk Park, Daejeon (KR); Cheol Hee Lee, Daejeon (KR); Hoon Jung, Daejeon (KR); Jong Young Jo, Daejeon (KR)

(73) Assignee: KOREA ELECTRIC POWER CORPORATION, Naju-si (KR)

( * ) Notice: Subject to any disclaimer, the term of this patent is extended or adjusted under 35 U.S.C. 154(b) by 35 days.

(21) Appl. No.: 16/331,947

(22) PCT Filed: Aug. 4, 2017

(86) PCT No.: PCT/KR2017/008462
§ 371 (c)(1),
(2) Date: Mar. 8, 2019

(87) PCT Pub. No.: WO2018/117365
PCT Pub. Date: Jun. 28, 2018

(65) Prior Publication Data
US 2019/0211734 A1      Jul. 11, 2019

(30) Foreign Application Priority Data
Dec. 19, 2016   (KR) .................. 10-2016-0173410

(51) Int. Cl.
*F01N 5/02*     (2006.01)
*F02G 5/02*     (2006.01)
(Continued)

(52) U.S. Cl.
CPC ................ *F01N 5/02* (2013.01); *F02G 5/02* (2013.01); *F25B 9/14* (2013.01); *F25B 27/02* (2013.01);
(Continued)

(58) Field of Classification Search
CPC .......... F01N 5/02; F01N 2240/02; F01N 5/04; F02G 5/02; F02G 2260/00; F25B 27/02;
(Continued)

(56) References Cited

U.S. PATENT DOCUMENTS

2012/0210713 A1\* 8/2012 Ernst ..................... F01N 5/02
60/615

FOREIGN PATENT DOCUMENTS

| JP | 2008-184906 A | 8/2008 |
| JP | 2010-077964 A | 4/2010 |

(Continued)

*Primary Examiner* — Brandon D Lee
(74) *Attorney, Agent, or Firm* — Foundation Law Group, LLP

(57) ABSTRACT

A control method of a waste heat recover device, the control method includes measuring a first state value of an organic refrigerant discharged from an organic refrigerant evaporator by a first state value measuring unit; determining whether the first state value measured by the first state value measuring unit deviates from a first set range and controlling a flow rate of an organic refrigerant introduced into the organic refrigerant evaporator by a first organic refrigerant variable valve when it is determined that the first state value deviates from the first set range.

12 Claims, 3 Drawing Sheets

(51) Int. Cl.
    *F25B 27/02*     (2006.01)
    *F25B 49/00*     (2006.01)
    *F25B 9/14*     (2006.01)
    *F25B 41/04*     (2006.01)
    *F25B 41/00*     (2006.01)
    *F01N 5/04*     (2006.01)

(52) U.S. Cl.
    CPC .............. *F25B 41/00* (2013.01); *F25B 41/04* (2013.01); *F25B 49/00* (2013.01); *F01N 5/04* (2013.01); *F01N 2240/02* (2013.01); *F02G 2260/00* (2013.01); *Y02A 30/274* (2018.01); *Y02T 10/16* (2013.01); *Y02T 10/166* (2013.01)

(58) Field of Classification Search
    CPC ........ F25B 41/00; F25B 41/003; F25B 41/04; F25B 49/00; F25B 9/14; Y02A 30/274; Y02T 10/16; Y02T 10/166
    See application file for complete search history.

(56) References Cited

FOREIGN PATENT DOCUMENTS

| | | | |
|---|---|---|---|
| JP | 2012-247081 | A | 12/2012 |
| JP | 2014-231738 | A | 12/2014 |
| KR | 10-2012-0108921 | A | 10/2012 |
| KR | 10-2013-0028537 | A | 3/2013 |

\* cited by examiner

WASTE HEAT RECOVERY APPARATUS AND CONTROL METHOD THEREFOR

CROSS REFERENCE TO RELATED PATENT APPLICATIONS

This application claims the benefit under 35 U.S.C. Section 371, of PCT International Application No. PCT/KR2017/008462 filed on Aug. 4, 2017, which claims priority to Korean Patent Application No. 10-2016-0173410 filed on Dec. 19, 2016, the disclosures of which are hereby incorporated by the references.

TECHNICAL FIELD

The present invention relates to a waste heat recovery device and a control method thereof, and more particularly, to a waste heat recovery device and a control method thereof capable of increasing a waste heat recovery rate.

BACKGROUND ART

Generally, waste heat generated in industrial facilities has mostly been discarded. There has been a growing interest in techniques to recover energy from waste heat in order to deal with fossil fuel depletion and reduce emission of greenhouse gases and emission of pollutants. Industrial waste heat has been continuously increasing, and commercialization of waste heat recovery techniques is important to achieve national greenhouse gas reduction targets.

Because a temperature of waste heat generated in industrial facilities is lower than a steam temperature of a thermoelectric power plant, it is difficult to apply an existing Rankine cycle utilizing steam of industrial facilities. Accordingly, an organic Rankine cycle (ORC) system utilizing an organic refrigerant which evaporates at a low temperature may be applied.

The ORC is a thermodynamic cycle which converts thermal energy into electrical energy. In order to obtain high energy conversion efficiency from a heat source in a low-temperature range, ORC uses a working fluid which evaporates at a low temperature. Freon, hydrocarbon-based organic medium, or the like is applied as the working fluid.

In order to increase a waste heat energy recovery amount in the Rankine cycle, a temperature difference and a pressure difference between an inlet and an outlet of a turbine should be large. Because conditions of a condenser, which is a low-temperature part, are not significantly different, the ORC efficiency increases as a temperature and a pressure of an organic refrigerant at the inlet of the turbine become higher. However, it is essential to design and operate the system so that the organic refrigerant does not exceed the critical conditions of temperature and pressure.

In the case of the ORC, when deviation from design conditions occurs, a condition of a working fluid at the inlet of the turbine may sharply change, and thus the overall energy recovery amount may significantly be reduced. A frequency at which the ORC is operated in off-design conditions is higher as compared with other power generation facilities, and thus it is difficult to maximize the waste heat recovery rate.

The related art of the present invention has been disclosed in Korean Unexamined Patent Application Publication No. 2013-0028537 (Date of Publication: Mar. 19, 2013, Title of Invention: Power Generation System).

DISCLOSURE

Technical Problem

The present invention has been devised to address the above problems, and the present invention is directed to providing a waste heat recovery device and a control method thereof capable of increasing a waste heat recovery rate.

Technical Solution

A waste heat recovery device according to the present invention includes an exhaust gas heat recoverer to which an exhaust gas line, along which an exhaust gas discharged from an engine flows, is connected, a cooling medium circulation line configured to circulate a cooling medium, which is discharged from the engine, through the exhaust gas heat recoverer, a cooling medium cooler, and the engine, an organic refrigerant evaporator connected to the cooling medium circulation line, an organic refrigerant circulation line configured to circulate an organic refrigerant along the organic refrigerant evaporator, an organic refrigerant turbine, an organic refrigerant condenser, and an organic refrigerant pump, a first state value measuring unit provided at a discharge side of the organic refrigerant evaporator in the organic refrigerant circulation line and configured to measure a first state value of the organic refrigerant, and a first organic refrigerant variable valve provided at an inflow side of the organic refrigerant evaporator in the organic refrigerant circulation line and configured to, when the first state value of the organic refrigerant measured by the first state value measuring unit deviates from a first set range, control a flow rate of the organic refrigerant introduced into the organic refrigerant evaporator.

When the first state value measured by the first state value measuring unit is above the first set range, the first organic refrigerant variable valve may be controlled so that the flow rate of the organic refrigerant introduced into the organic refrigerant evaporator is increased.

When the first state value measured by the first state value measuring unit is below the first set range, the first organic refrigerant variable valve may be controlled so that the flow rate of the organic refrigerant introduced into the organic refrigerant evaporator is decreased.

The waste heat recovery device may further include a first bypass line branched from the organic refrigerant circulation line between the organic refrigerant evaporator and the organic refrigerant pump and connected to the first organic refrigerant variable valve, and an organic refrigerant buffer tank connected to the first bypass line.

The waste heat recovery device may further include a second organic refrigerant variable valve provided in the organic refrigerant circulation line between the organic refrigerant condenser and the organic refrigerant pump, a second bypass line configured to connect the organic refrigerant circulation line, which connects the organic refrigerant evaporator and the organic refrigerant turbine, and the second organic refrigerant variable valve, and an organic refrigerant mixing unit provided in the second bypass line and the organic refrigerant circulation line and into which the organic refrigerant discharged from the organic refrigerant condenser is introduced through the second bypass line.

The waste heat recovery device may further include a second state value measuring unit disposed between the second bypass line and the organic refrigerant turbine in the organic refrigerant circulation line and configured to measure a second state value of the organic refrigerant introduced into the organic refrigerant turbine, and when the second state value measured by the second state value measuring unit is above a second set range, the second organic refrigerant variable valve may be controlled so that the organic refrigerant is distributed to the organic refrigerant pump and the second bypass line.

The waste heat recovery device may further include a third state value measuring unit provided at an exhaust gas discharge side of a supercharger turbine in the exhaust gas line and configured to measure a third state value of an exhaust gas, and a cooling medium variable valve provided in the cooling medium circulation line and configured to, when the third state value of the exhaust gas measured by the third state value measuring unit deviates from a third set range, control a flow rate of the cooling medium introduced into the exhaust gas heat recoverer.

The organic refrigerant circulation line between the first organic refrigerant variable valve and the organic refrigerant evaporator may be connected to a supercharger intercooler so that a heat exchange occurs with air introduced into the engine.

A control method of a waste heat recovery device according to the present invention includes measuring a first state value of an organic refrigerant discharged from an organic refrigerant evaporator by a first state value measuring unit; determining whether the first state value measured by the first state value measuring unit deviates from a first set range; and controlling a flow rate of an organic refrigerant introduced into the organic refrigerant evaporator by a first organic refrigerant variable valve when it is determined that the first state value deviates from the first set range.

When the first state value measured by the first state value measuring unit is above the first set range, the first organic refrigerant variable valve may be controlled so that the flow rate of the organic refrigerant introduced into the organic refrigerant evaporator is increased.

When the first state value measured by the first state value measuring unit is below the first set range, the first organic refrigerant variable valve may be controlled so that the flow rate of the organic refrigerant introduced into the organic refrigerant evaporator is decreased.

The control method of the waste heat recovery device may further include measuring a second state value of an organic refrigerant introduced into an organic refrigerant turbine by a second state value measuring unit; and when the second state value of the organic refrigerant measured by the second state value measuring unit is above a second set range, controlling a second organic refrigerant variable valve so that a portion of an organic refrigerant discharged from an organic refrigerant condenser is introduced into an organic refrigerant mixing unit through a second bypass line.

The control method of the waste heat recovery device may further include measuring a third state value of an exhaust gas by a third state value measuring unit, which is provided at an exhaust gas discharge side of a supercharger turbine; and when the third state value of the exhaust gas measured by the third state value measuring unit deviates from a third set range, controlling a cooling medium variable valve so that a flow rate of a cooling medium introduced into an exhaust gas heat recoverer is adjusted.

A portion of an organic refrigerant circulation line connecting the first organic refrigerant variable valve and the organic refrigerant evaporator may be connected to a supercharger intercooler and cause the organic refrigerant to be heat-exchanged with air introduced into the engine and then introduced into the organic refrigerant evaporator.

Advantageous Effects

According to the present invention, when a first state value of an organic refrigerant measured by a first state value measuring unit deviates from a first set range, a first organic refrigerant variable valve controls a flow rate of an organic refrigerant introduced into an organic refrigerant evaporator. Consequently, because the organic refrigerant discharged from the organic refrigerant evaporator can be continuously maintained to be within the first set range, a heat recovery rate from the organic refrigerant evaporator can be increased.

In addition, according to the present invention, when a second state value of an organic refrigerant measured by a second state value measuring unit reaches a second range, a second organic refrigerant variable valve is controlled so that the organic refrigerant is distributed to an organic refrigerant turbine and a second organic refrigerant bypass unit. Consequently, because an inlet condition of the organic refrigerant turbine can be maintained to be subcritical, the organic refrigerant turbine can be prevented from being damaged.

MODES OF THE INVENTION

Figure 1:
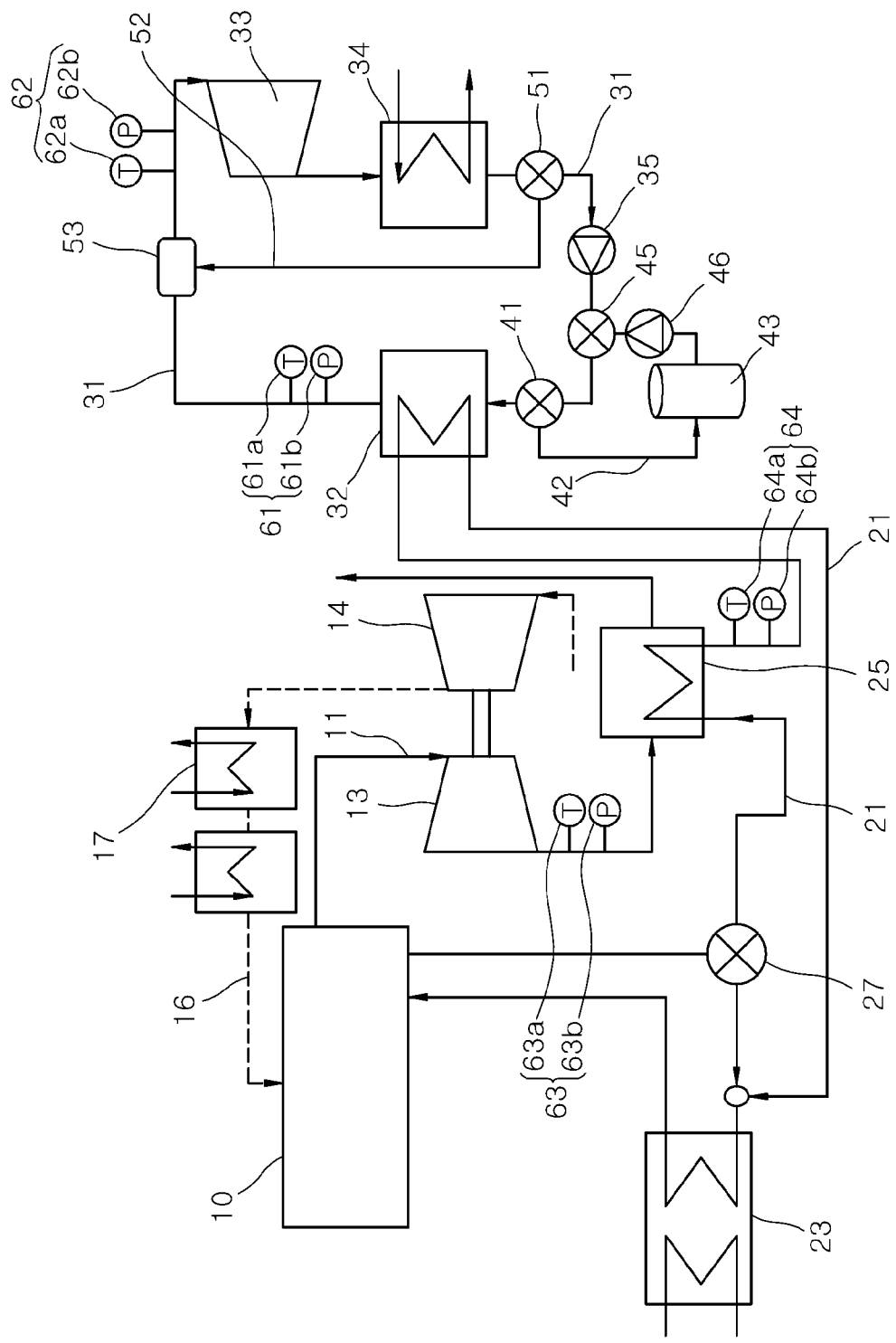
FIG. 1 is a piping and instrumentation diagram illustrating a waste heat recovery device according to an embodiment of the present invention.

Hereinafter, embodiments of a waste heat recovery device and a control method thereof according to the present invention will be described with reference to the accompanying drawings. In the process of describing the waste heat recovery device and control method thereof, the thickness of lines or the size of elements illustrated in the drawings may have been exaggerated for clarity and convenience of description. In addition, the terms used herein are defined in consideration of functions in the present invention and may vary according to an intention or practice of a user or an operator. Therefore, the terms should be defined on the basis of content throughout the present specification.

FIG. 1 is a piping and instrumentation diagram illustrating a waste heat recovery device according to an embodiment of the present invention.

Referring to FIG. 1, the waste heat recovery device according to an embodiment of the present invention includes an exhaust gas heat recoverer 25, a cooling medium circulation line 21, an organic refrigerant evaporator 32, an organic refrigerant circulation line 31, a first state value measuring unit 61, and a first organic refrigerant variable valve 41.

An exhaust gas line 11 in which an exhaust gas discharged from an engine 10 flows is connected to the exhaust gas heat recoverer 25. The exhaust gas discharged from the engine 10 is introduced into the exhaust gas heat recoverer 25 through the exhaust gas line 11 and then discharged through an exhaust gas discharger (not illustrated).

A supercharger turbine 13 is connected to the exhaust gas line 11, and a supercharger compressor 14 is connected to the supercharger turbine 13. The supercharger turbine 13 is driven by an exhaust gas pressure, and the supercharger compressor 14 is driven by the supercharger turbine 13. The supercharger compressor 14 compresses air for combustion and then supplies the air for combustion to a supercharger intercooler 17, and the supercharger intercooler 17 cools the air for combustion and then supplies the air for combustion to the engine 10. The supercharger intercooler 17 may be provided in plural in series along an air supply line 16. As a cooling medium supplied from a cooling medium supply unit (not illustrated) is introduced into the supercharger intercooler 17, the supercharger intercooler 17 cools the air for combustion that has been compressed by the supercharger compressor 14.

The engine 10, the exhaust gas heat recoverer 25, and a cooling medium cooler 23 are connected to the cooling medium circulation line 21. The cooling medium circulation line 21 causes a cooling medium discharged from the engine 10 to be circulated in a closed loop through the exhaust gas heat recoverer 25, the cooling medium cooler 23, and the engine 10.

An organic refrigerant Rankine cycle unit is connected to the cooling medium circulation line 21. The organic refrigerant Rankine cycle unit includes the organic refrigerant evaporator 32, an organic refrigerant turbine 33, an organic refrigerant condenser 34, and an organic refrigerant pump 35. The organic refrigerant evaporator 32 is connected to the cooling medium circulation line 21.

The organic refrigerant circulation line 31 circulates the organic refrigerant along the organic refrigerant evaporator 32, the organic refrigerant turbine 33, the organic refrigerant condenser 34, and the organic refrigerant pump 35. The organic refrigerant flowing along the organic refrigerant circulation line 31 is heat-exchanged with a cooling medium in the organic refrigerant evaporator 32 and compressed.

The first state value measuring unit 61 is provided at a discharge side of the organic refrigerant evaporator 32 in the organic refrigerant circulation line 31. The first state value measuring unit 61 measures a first state value of an organic refrigerant discharged from the organic refrigerant evaporator 32. Here, the first state value may refer to either a temperature of the organic refrigerant or a pressure thereof or may refer to the temperature and pressure at the same time. The first state value measuring unit 61 includes at least one of a first temperature sensor 61a and a first pressure sensor 61b.

The first organic refrigerant variable valve 41 is connected to an inflow side of the organic refrigerant evaporator 32 in the organic refrigerant circulation line 31. When the first state value of the organic refrigerant measured by the first state value measuring unit 61 deviates from a first set range, the first organic refrigerant variable valve 41 controls a flow rate of the organic refrigerant introduced into the organic refrigerant evaporator 32. In this case, because the flow rate of the organic refrigerant introduced into the organic refrigerant evaporator 32 may be controlled according to the flow rate, pressure, temperature, and the like of the exhaust gas in the exhaust gas line 11, the organic refrigerant discharged from the organic refrigerant evaporator 32 may be continuously maintained to be within the first set range.

For example, when the first state value measured by the first state value measuring unit 61 is above the first set range, the first organic refrigerant variable valve 41 is controlled so that the flow rate of the organic refrigerant introduced into the organic refrigerant evaporator 32 is increased. That is, when at least one of the temperature and pressure of the organic refrigerant discharged from the organic refrigerant evaporator 32 is higher than the first set range, a greater amount of organic refrigerant is introduced into the organic refrigerant evaporator 32. In this way, because heat exchange efficiency per unit volume of the organic refrigerant becomes lower in the organic refrigerant evaporator 32, the temperature and/or pressure that has been above the first set range becomes lower and falls within the first set range.

That is, when the temperature of the organic refrigerant discharged from the organic refrigerant evaporator 32 is higher than the first set range, the corresponding temperature value becomes gradually lower by control of the first organic refrigerant variable valve 41 and falls within the first set range, and when the pressure of the organic refrigerant is higher than the first set range, the corresponding pressure value becomes gradually lower by control of the first organic refrigerant variable valve 41 and falls within the first set range. When both the temperature and pressure of the organic refrigerant are above the first set range, both the corresponding temperature and pressure values gradually become lower by control of the first organic refrigerant variable valve 41 and fall within the first set range.

Also, when the first state value measured by the first state value measuring unit 61 is below the first set range, the first organic refrigerant variable valve 41 is controlled so that the flow rate of the organic refrigerant introduced into the organic refrigerant evaporator 32 is decreased. That is, when at least one of the temperature and pressure of the organic refrigerant discharged from the organic refrigerant evaporator 32 is below the first set range, as a greater amount of organic refrigerant is introduced into the organic refrigerant evaporator 32, the temperature and/or pressure that has been below the first set range becomes higher and falls within the first set range.

That is, when the temperature of the organic refrigerant discharged from the organic refrigerant evaporator 32 is below the first set range, the corresponding temperature value becomes gradually higher by control of the first organic refrigerant variable valve 41 and falls within the first set range, and when the pressure of the organic refrigerant is below the first set range, the corresponding pressure value becomes gradually higher by control of the first organic refrigerant variable valve 41 and falls within the first set range. When both the temperature and pressure of the organic refrigerant are below the first set range, both the corresponding temperature and pressure values gradually become higher by control of the first organic refrigerant variable valve 41 and fall within the first set range.

The first set range may be set in various ways according to the capacity of the organic refrigerant turbine, the type of organic refrigerant, and the like.

The waste heat recovery device further includes a first bypass line 42 and an organic refrigerant buffer tank 43.

The first bypass line 42 is connected to the first organic refrigerant variable valve 41 and is branched from a portion of the organic refrigerant circulation line 31 between the first organic refrigerant variable valve 41 and the organic refrigerant pump 35. The organic refrigerant buffer tank 43 is disposed in the first bypass line 42. When it is determined that the first state value measured by the first state value measuring unit 61 is below the first set range, as the first organic refrigerant variable valve 41 is adjusted, the organic refrigerant is distributed to the first bypass line 42 and the organic refrigerant evaporator 32. Because the organic refrigerant introduced into the first bypass line 42 is stored in the organic refrigerant buffer tank 43, the flow rate of the organic refrigerant introduced into the organic refrigerant evaporator 32 may be decreased.

Consequently, because the efficiency at which the organic refrigerant is heat-exchanged by a cooling medium in the organic refrigerant evaporator 32 may be controlled, an organic refrigerant suitable for design conditions of the organic refrigerant turbine 33 may be supplied to the organic refrigerant turbine 33. Further, a maximum output may occur in the organic refrigerant turbine 33, and damages to the organic refrigerant turbine 33 may be prevented.

A bypass pump 46 and a bypass valve 45 are provided in the first bypass line 42. The bypass pump 46 pumps the organic refrigerant in the organic refrigerant buffer tank 43 to the organic refrigerant circulation line 31, and the bypass valve 45 is adjusted so that the organic refrigerant in the first bypass line 42 is re-introduced into the organic refrigerant circulation line 31. When the first organic refrigerant variable valve 41 blocks introduction of the organic refrigerant into the first bypass line 42, the bypass valve 45 also blocks the first bypass line 42.

The waste heat recovery device further includes a second organic refrigerant variable valve 51, a second bypass line 52, and an organic refrigerant mixing unit 53.

The second organic refrigerant variable valve 51 is provided at a portion of the organic refrigerant circulation line 31 connecting the organic refrigerant condenser 34 and the organic refrigerant pump 35. The second bypass line 52 connects a portion of the organic refrigerant circulation line 31, which connects the organic refrigerant evaporator 32 and the organic refrigerant turbine 33, and the second organic refrigerant variable valve 51. The organic refrigerant mixing unit 53 is provided at a connection portion between the second bypass line 52 and the organic refrigerant circulation line 31.

The organic refrigerant discharged from the organic refrigerant condenser 34 is introduced into the organic refrigerant mixing unit 53 through the second bypass line 52. The second organic refrigerant variable valve 51 distributes the organic refrigerant toward the second bypass line 52 and the organic refrigerant pump 35. When a low-temperature, low-pressure organic refrigerant discharged from the organic refrigerant condenser 34 is introduced into the organic refrigerant mixing unit 53 through the second bypass line 52, the temperature and pressure of the organic refrigerant supplied to the organic refrigerant turbine 33 may be decreased.

The waste heat recovery device further includes a second state value measuring unit 62 disposed between the second bypass line 52 and the organic refrigerant turbine 33 in the organic refrigerant circulation line 31 and configured to measure a second state value of the organic refrigerant introduced into the organic refrigerant turbine 33. The second state value measuring unit 62 includes at least one of a second temperature sensor 62a and a second pressure sensor 62b.

When the second state value of the organic refrigerant measured by the second state value measuring unit 62 is above a second set range, the second organic refrigerant variable valve 51 is controlled so that the organic refrigerant is distributed to the organic refrigerant pump 35 and the second bypass line 52. When a portion of the organic refrigerant is introduced into the second bypass line 52, the flow rate of the organic refrigerant pumped from the organic refrigerant pump 35 is relatively decreased. When, as a result of determining the second state value measured by the second state value measuring unit 62, it is predicted that the organic refrigerant will reach a supercritical condition, the second organic refrigerant variable valve 51 is controlled so that a portion of the organic refrigerant flows to the second bypass line 52. A low-temperature, low-pressure organic refrigerant introduced into the second bypass line 52 is mixed with a high-temperature, high-pressure organic refrigerant in the organic refrigerant mixing unit 53 and then re-introduced into the organic refrigerant turbine 33. Consequently, because an inlet condition of the organic refrigerant turbine 33 may be maintained to be subcritical, the organic refrigerant turbine 33 may be prevented from being damaged.

Here, the supercritical condition refers to a state in which the temperature and pressure of an organic refrigerant are above the second set range, and the subcritical condition refers to a state in which the temperature and pressure of an organic refrigerant are maintained in the second set range.

The waste heat recovery device further includes a third state value measuring unit 63 and a cooling medium variable valve 27.

The third state value measuring unit 63 is provided at an exhaust gas discharge side of the supercharger turbine 13 in the exhaust gas line 11. The cooling medium variable valve 27 is provided in the cooling medium circulation line 21, and when a third state value of an exhaust gas measured by the third state value measuring unit 63 deviates from a third set range, a flow rate of the cooling medium introduced into the exhaust gas heat recoverer 25 is controlled. Because the cooling medium variable valve 27 controls the flow rate of the cooling medium in the cooling medium circulation line 21 according to the third state value of the exhaust gas, the flow rate of the cooling medium introduced into the organic refrigerant evaporator 32 may be controlled according to the third state value of the exhaust gas.

The third state value refers to at least one of the temperature and pressure of the exhaust gas flowing along the exhaust gas line 11. That is, the third state value may be either the temperature or pressure of the exhaust gas flowing along the exhaust gas line 11 or may be both the temperature and pressure thereof. The third state value measuring unit 63 includes at least one of a third temperature sensor 63a and a third pressure sensor 63b.

When the third state value of the exhaust gas measured by the third state value measuring unit 63 is above the third set range, the cooling medium variable valve 27 is controlled so that the flow rate of the exhaust gas introduced into the exhaust gas heat recoverer 25 is increased.

Also, when the third state value of the exhaust gas measured by the third state value measuring unit 63 is below the third set range, the cooling medium variable valve 27 is controlled so that the flow rate of the exhaust gas introduced into the exhaust gas heat recoverer 25 is decreased.

A fourth state value measuring unit 64 is provided between the exhaust gas heat recoverer 25 and the organic refrigerant evaporator 32 in the cooling medium circulation line 21. The fourth state value measuring unit 64 includes at least one of a fourth temperature sensor 64a and a fourth pressure sensor 64b.

The fourth state value measuring unit 64 measures a fourth state value of a cooling medium heat-exchanged in the exhaust gas heat recoverer 25. The first organic refrigerant variable valve 41 may be controlled according to the fourth state value. For example, when the fourth state value is above a fourth set range, the first organic refrigerant variable valve 41 may increase the flow rate of the organic refrigerant supplied to the organic refrigerant evaporator 32. Also, when the fourth state value is below the fourth set range, the first organic refrigerant variable valve 41 may decrease the flow rate of the organic refrigerant supplied to the organic refrigerant evaporator 32.

A control method and an operation of the waste heat recovery device according to an embodiment of the present invention configured as above will be described.

Figure 2:
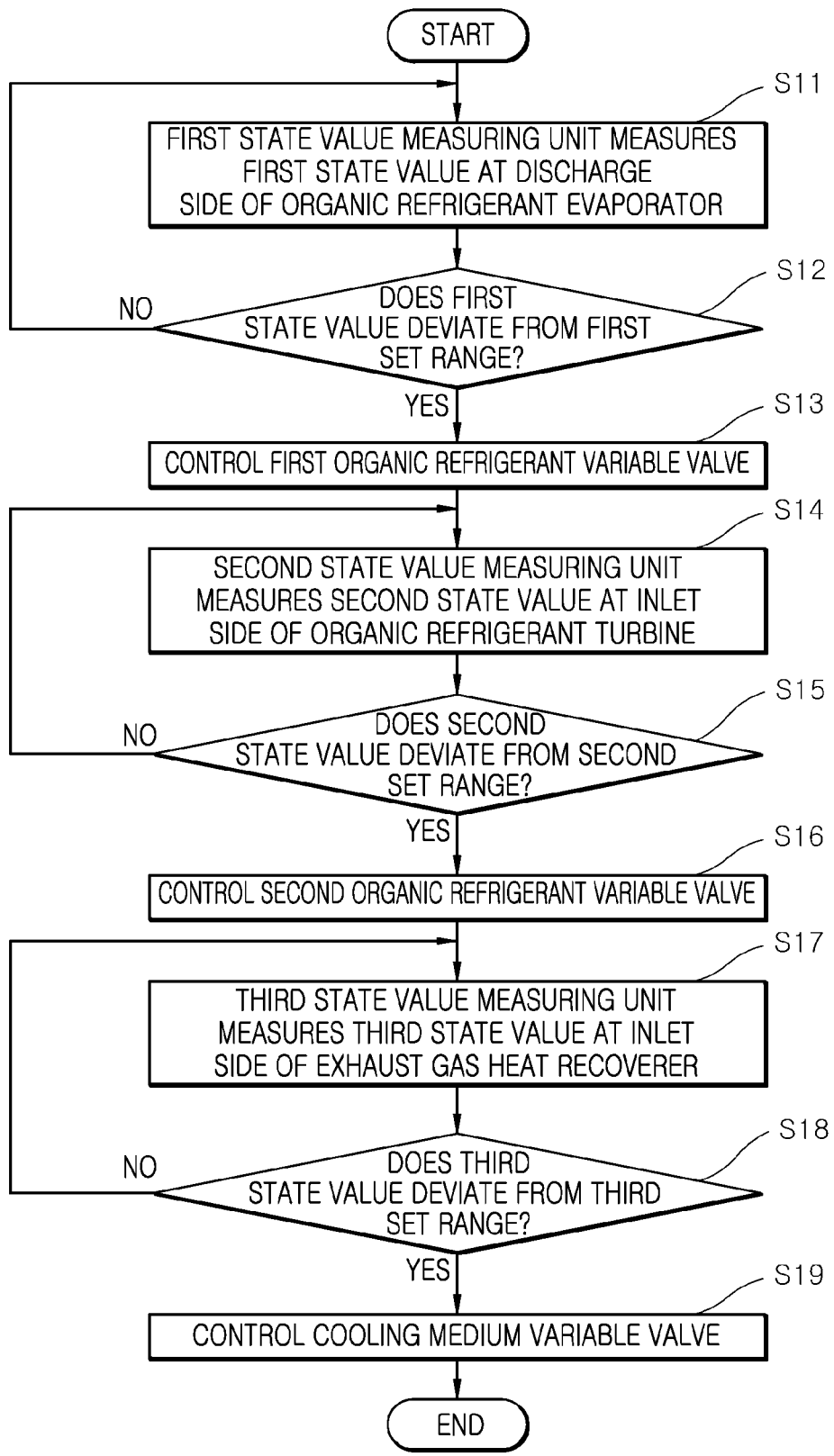
FIG. 2 is a flowchart illustrating a control method of the waste heat recovery device according to an embodiment of the present invention.

FIG. 2 is a flowchart illustrating the control method of the waste heat recovery device according to an embodiment of the present invention.

Referring to FIG. 2, an exhaust gas, a cooling medium, and an organic refrigerant flow through separate circulation paths in the waste heat recovery device.

The exhaust gas discharged from the engine 10 sequentially passes through the supercharger turbine 13 and the exhaust gas heat recoverer 25 and then is supplied to the exhaust gas discharger.

The cooling medium that cools the engine 10 sequentially passes through the cooling medium variable valve 27, the exhaust gas heat recoverer 25, the organic refrigerant evaporator 32, and the cooling medium cooler 23 and then is re-introduced into the engine 10.

The organic refrigerant sequentially passes through the organic refrigerant evaporator 32, the organic refrigerant turbine 33, the organic refrigerant condenser 34, the second organic refrigerant variable valve 51, the organic refrigerant pump 35, and the first organic refrigerant variable valve 41 and then is re-introduced into the organic refrigerant evaporator 32.

In this case, a first state value (temperature and/or pressure) of the organic refrigerant discharged from the organic refrigerant evaporator 32 is measured by the first state value measuring unit 61 (S11).

Whether the first state value measured by the first state value measuring unit 61 is above a first set range is determined (S12).

When the first state value measured by the first state value measuring unit 61 is above the first set range, the first organic refrigerant variable valve 41 is controlled so that flow of the organic refrigerant to the first bypass line 42 is prevented (S13). Consequently, because the flow rate of the organic refrigerant supplied to the organic refrigerant evaporator 32 is increased, the first state value of the organic refrigerant discharged from the organic refrigerant evaporator 32 becomes lower and enters the first set range. In other words, when the temperature and/or pressure of the cooling medium supplied to the organic refrigerant evaporator 32 is above the first set range, as the flow rate of the organic refrigerant supplied to the organic refrigerant evaporator 32 is increased, the heat exchange efficiency per unit volume of the organic refrigerant may be lowered.

Also, when the first state value measured by the first state value measuring unit 61 is below the first set range, the first organic refrigerant variable valve 41 is controlled so that the organic refrigerant flows to the organic refrigerant evaporator 32 and the first bypass line 42. Consequently, because the flow rate of the organic refrigerant supplied to the organic refrigerant evaporator 32 is decreased, the first state value of the organic refrigerant discharged from the organic refrigerant evaporator 32 becomes higher and falls within the first set range.

Meanwhile, the second state value measuring unit 62 measures a second state value (temperature and/or pressure) of the organic refrigerant introduced into the organic refrigerant turbine 33 (S14). Whether the second state value measured by the second state value measuring unit 62 is above a second set range is determined (S15).

When the second state value measured by the second state value measuring unit 62 is above the second set range, the second organic refrigerant variable valve 51 is controlled so that the organic refrigerant discharged from the organic refrigerant condenser 34 is distributed to the organic refrigerant pump 35 and the second bypass line 52 (S16). Because a low-temperature, low-pressure organic refrigerant condensed by the organic refrigerant condenser 34 is mixed with a high-temperature, high-pressure organic refrigerant discharged from the organic refrigerant evaporator 32 by the organic refrigerant mixing unit 53, the second state value of the organic refrigerant becomes lower in the organic refrigerant mixing unit 53 and falls within the second set range. Consequently, because a condition of the organic refrigerant flowing toward the inlet of the organic refrigerant turbine 33 is changed from a supercritical condition to a subcritical condition, damages to the organic refrigerant turbine 33 may be prevented.

Also, a third state value (temperature and/or pressure) at an inlet side of the exhaust gas heat recoverer 25 is measured by the third state value measuring unit 63 (S17). Whether the third state value of the exhaust gas measured by the third state value measuring unit 63 is above a third set range is determined (S18).

When the third state value of the exhaust gas measured by the third state value measuring unit 63 is above the third set range, the cooling medium variable valve 27 is controlled so that the flow rate of the cooling medium introduced into the exhaust gas heat recoverer 25 is increased (S19). Consequently, because the flow rate of the cooling medium supplied to the exhaust gas heat recoverer 25 is increased, the third state value of the cooling medium heat-exchanged in the exhaust gas heat recoverer 25 becomes relatively lower. Also, because the cooling medium having a low third state value is also supplied to the organic refrigerant evaporator 32, the first organic refrigerant variable valve 41 may be controlled so that the flow rate of the organic refrigerant supplied to the organic refrigerant evaporator 32 is adjusted corresponding to the flow rate of the cooling medium supplied to the organic refrigerant evaporator 32.

Next, a waste heat recovery device according to another embodiment of the present invention will be described. Because the other embodiment is substantially the same as the above-described embodiment except for a heat exchange means of an organic refrigerant circulation line, only unique features of the other embodiment will be described below, and description of configurations thereof same as the above-described embodiment will be omitted.

Figure 3:
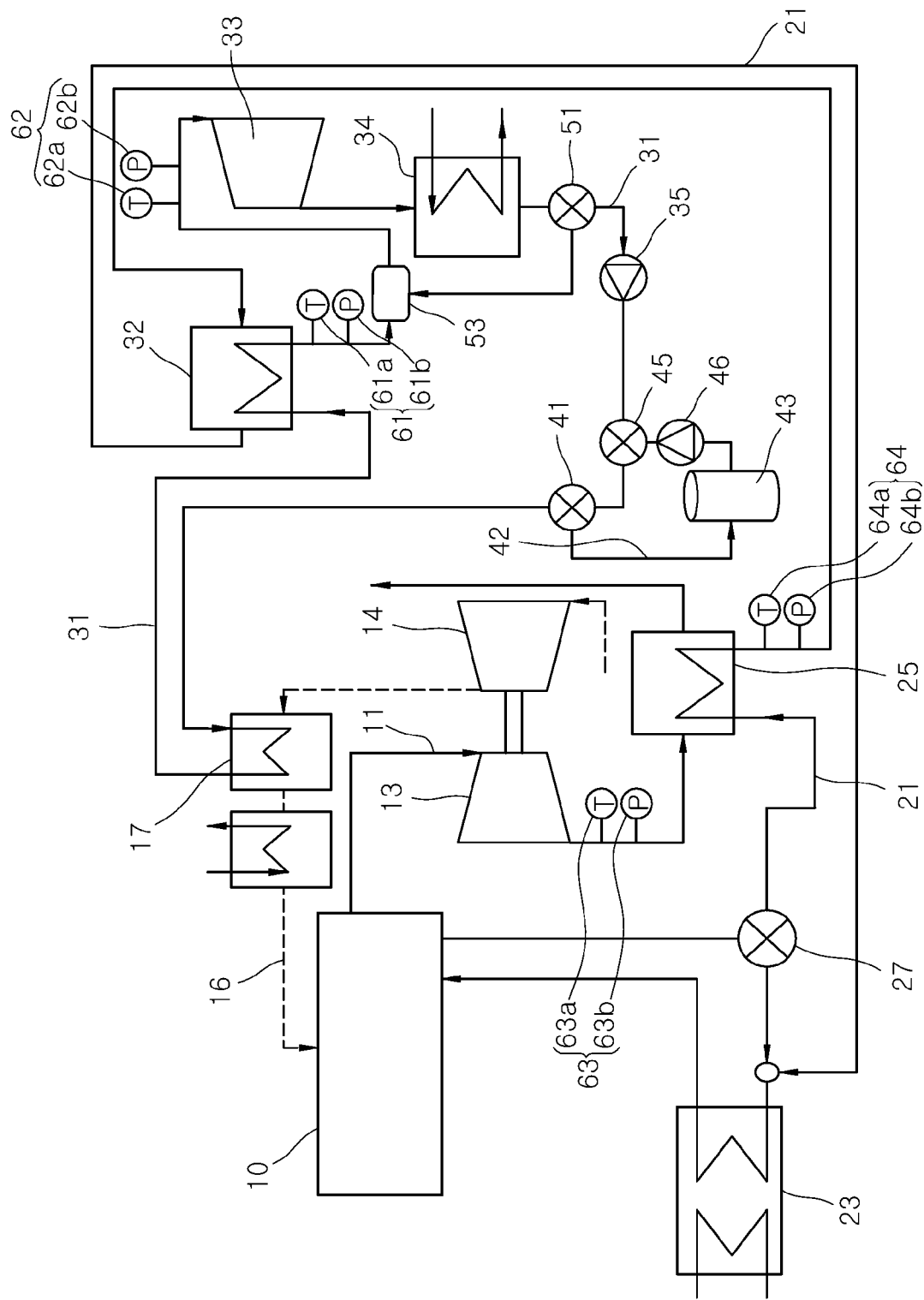
FIG. 3 is a piping and instrumentation diagram illustrating a waste heat recovery device according to another embodiment of the present invention.

FIG. 3 is a piping and instrumentation diagram illustrating the waste heat recovery device according to the other embodiment of the present invention.

Referring to FIG. 3, a portion of the organic refrigerant circulation line 31 connecting the first organic refrigerant variable valve 41 and the organic refrigerant evaporator 32 is connected to the supercharger intercooler 17 so that a heat exchange occurs with air introduced into the engine 10.

The organic refrigerant discharged from the organic refrigerant evaporator 32 is re-cooled by the supercharger intercooler 17 and then introduced into the organic refrigerant evaporator 32. In this case, when it is assumed that the temperature of the cooling medium introduced into the organic refrigerant evaporator 32 is maintained to be constant, because the organic refrigerant at the inlet side of the organic refrigerant evaporator 32 is cooled by the supercharger intercooler 17, a temperature difference between the inlet side and outlet side of the organic refrigerant evaporator 32 becomes large. Consequently, the waste heat recovery rate from the organic refrigerant evaporator 32 may be increased.

The present invention has been described above with reference to the embodiments illustrated in the drawings, but the above description is merely illustrative, and those of ordinary skill in the art should understand that various modifications and other equivalent embodiments are possible therefrom. Consequently, the actual technical scope of the present invention should be defined by the claims below.

The invention claimed is:

1. A waste heat recovery device comprising:
an exhaust gas heat recoverer to which an exhaust gas line, along which an exhaust gas discharged from an engine flows, is connected;
a cooling medium circulation line configured to circulate a cooling medium, which is discharged from the engine, through the exhaust gas heat recoverer, a cooling medium cooler, and the engine;
an organic refrigerant evaporator connected to the cooling medium circulation line;
an organic refrigerant circulation line configured to circulate an organic refrigerant along the organic refrigerant evaporator, an organic refrigerant turbine, an organic refrigerant condenser, and an organic refrigerant pump;
a first state value measuring unit provided at a discharge side of the organic refrigerant evaporator in the organic refrigerant circulation line and configured to measure a first state value of the organic refrigerant;
a first organic refrigerant variable valve provided at an inflow side of the organic refrigerant evaporator in the organic refrigerant circulation line and configured to, when the first state value of the organic refrigerant measured by the first state value measuring unit deviates from a first set range, control a flow rate of the organic refrigerant introduced into the organic refrigerant evaporator a second organic refrigerant variable valve provided in the organic refrigerant circulation line between the organic refrigerant condenser and the organic refrigerant pump; a second bypass line configured to connect the organic refrigerant circulation line, which connects the organic refrigerant evaporator and the organic refrigerant turbine, and the second organic refrigerant variable valve; and an organic refrigerant mixing unit provided in the second bypass line and the organic refrigerant circulation line and into which the organic refrigerant discharged from the organic refrigerant condenser is introduced through the second bypass line.

2. The waste heat recovery device of claim 1, wherein, when the first state value measured by the first state value measuring unit is above the first set range, the first organic refrigerant variable valve is controlled so that the flow rate of the organic refrigerant introduced into the organic refrigerant evaporator is increased.

3. The waste heat recovery device of claim 1, wherein, when the first state value measured by the first state value measuring unit is below the first set range, the first organic refrigerant variable valve is controlled so that the flow rate of the organic refrigerant introduced into the organic refrigerant evaporator is decreased.

4. The waste heat recovery device of claim 3, further comprising:
a first bypass line branched from the organic refrigerant circulation line between the organic refrigerant evaporator and the organic refrigerant pump and connected to the first organic refrigerant variable valve; and
an organic refrigerant buffer tank provided in the first bypass line.

5. The waste heat recovery device of claim 1, further comprising a second state value measuring unit disposed between the second bypass line and the organic refrigerant turbine in the organic refrigerant circulation line and configured to measure a second state value of the organic refrigerant introduced into the organic refrigerant turbine,
wherein, when the second state value measured by the second state value measuring unit is above a second set range, the second organic refrigerant variable valve is controlled so that the organic refrigerant is distributed to the organic refrigerant pump and the second bypass line.

6. The waste heat recovery device of claim 1, further comprising:
a third state value measuring unit provided at an exhaust gas discharge side of a supercharger turbine in the exhaust gas line and configured to measure a third state value of the exhaust gas; and
a cooling medium variable valve provided in the cooling medium circulation line and configured to, when the third state value of the exhaust gas measured by the third state value measuring unit deviates from a third set range, control a flow rate of the cooling medium introduced into the exhaust gas heat recoverer.

7. The waste heat recovery device of claim 1, wherein the organic refrigerant circulation line between the first organic refrigerant variable valve and the organic refrigerant evaporator is connected to a supercharger intercooler so that a heat exchange occurs with air introduced into the engine.

8. A control method of a waste heat recovery device, the control method comprising:
measuring a first state value of an organic refrigerant discharged from an organic refrigerant evaporator by a first state value measuring unit;
determining whether the first state value measured by the first state value measuring unit deviates from a first set range;
controlling a flow rate of an organic refrigerant introduced into the organic refrigerant evaporator by a first organic refrigerant variable valve when it is determined that the first state value deviates from the first set range measuring a second state value of an organic refrigerant introduced into an organic refrigerant turbine by a second state value measuring unit; and when the second state value of the organic refrigerant measured by the second state value measuring unit is above a second set range, controlling a second organic refrigerant variable valve so that a portion of an organic refrigerant discharged from an organic refrigerant condenser is introduced into an organic refrigerant mixing unit through a second bypass line.

9. The control method of claim 8, wherein, when the first state value measured by the first state value measuring unit is above the first set range, the first organic refrigerant variable valve is controlled so that the flow rate of the organic refrigerant introduced into the organic refrigerant evaporator is increased.

10. The control method of claim 8, wherein, when the first state value measured by the first state value measuring unit is below the first set range, the first organic refrigerant variable valve is controlled so that the flow rate of the organic refrigerant introduced into the organic refrigerant evaporator is decreased.

11. The control method of claim 8, further comprising:
measuring a third state value of an exhaust gas by a third state value measuring unit, which is provided at an exhaust gas discharge side of a supercharger turbine; and
when the third state value of the exhaust gas measured by the third state value measuring unit deviates from a third set range, controlling a cooling medium variable valve so that a flow rate of a cooling medium introduced into an exhaust gas heat recoverer is adjusted.

12. The control method of claim 8, wherein an organic refrigerant circulation line connecting the first organic refrigerant variable valve and the organic refrigerant evaporator is connected to a supercharger intercooler and causes the organic refrigerant to be heat-exchanged with air introduced into the engine and then introduced into the organic refrigerant evaporator.

* * * * *